United States Patent

Kazeniac et al.

[15] 3,660,112

[45] May 2, 1972

[54] 2-ALKYLTHIAZOLES AS TOMATO PRODUCT FLAVOR ENHANCERS

[72] Inventors: Stanley J. Kazeniac, Narberth, Pa.; Robert M. Hall, Haddonfield, N.J.

[73] Assignee: Campbell Soup Company, Camden, N.J.

[22] Filed: Nov. 7, 1969

[21] Appl. No.: 870,462

[52] U.S. Cl. .................................................99/100, 99/140
[51] Int. Cl. .........................................................A23l 1/00
[58] Field of Search ..........................99/100, 103, 140 R, 11; 260/302 R

[56] References Cited

OTHER PUBLICATIONS

Chem. Abstracts 1937– 1949 32:84857 Growth of Excised Roots of the Tomato.
Chem. Abstracts 1960 54:P3837i Thraydes as Insecticides or Fungicides.
Helvetica Chimica Acta July 18, 1969 Vol. 52 887– 891 Viam Sur la Composition de l' Aromede Tomato.
Flavor Chemistry of Tomato Volatiles, S. J. Kazemiac, Journal of Food Science Vol. 35 No. 5 pp. 519– 530, 1970.

*Primary Examiner*—Norman Yudkoff
*Assistant Examiner*—Hiram H. Bernstein
*Attorney*—Howson and Howson

[57] ABSTRACT

2-alkylthiazoles, and in particular, 2-isobutylthiazole, and their use as food additives for improving the aroma and flavor of tomato products.

18 Claims, No Drawings

2-ALKYLTHIAZOLES AS TOMATO PRODUCT FLAVOR ENHANCERS

BACKGROUND OF THE INVENTION

For some time now efforts have been made to identify chemical compounds, and to determine the practical use of these compounds, which when added to tomato-containing foods would enhance the agreeable tomato aroma and flavor of such foods. A great deal of research was directed to isolating and identifying the complex chemical compounds naturally occurring in the common tomato, usually found in the form of volatiles, which constitute or contribute significantly to the tomato aroma and flavor. Research was also directed toward acquiring an understanding why particular varieties of tomatoes, such as Campbell Variety no. 146, have a unique, highly pleasant flavor while other varieties possess this flavor to a lesser degree. Other research sought to identify flavor compounds, whether or not naturally occurring in the tomato, which could be readily synthesized and used as additives to improve the flavor of foods containing tomatoes such as soups, sauces, vegetable or fruit drinks, tomato pastes, salad dressings, or synthetic tomato flavorings or seasoning products.

A number of problems were encountered. First, it was noted that several volatiles which appeared to affect the tomato flavor in certain foods were altered by the standard preparation treatments employed to identify the volatiles. The presence and nature of the volatiles appear to depend on the physical condition and maturity of the fruit from which they are extracted as well as the type of crushing used, the holding time of the juice or pulp after crushing, and the presence of heat and oxygen during extraction. Many of the volatiles were found to be highly labile during normal processing and frequently broke down into other compounds even after they were added to the tomato product. In addition, synergistic action among the compounds in the fruit often causes the flavor evaluation of the pure compound in a pure medium to be quite different from the flavor contribution of the compound when added to the fruit or fruit product. Because of the complexity of the well-known tomato flavor, it was most difficult to identify any particular compound as contributing significantly to the overall flavor. This was particularly true for 2-isobutylthiazole as this compound had not previously been reported as existing in natural products and, consequently, the presence and identification of this compound in a natural product was not predictable nor common knowledge.

SUMMARY OF THE INVENTION

It was the general object of the present invention to identify and establish the nature of use of chemical compounds which would serve to enhance the aroma and flavor of a variety of tomato food products or which could be used as tomato seasonings or condiments.

It was a further object of this invention to identify the flavor compounds occurring naturally in tomatoes and to provide ways to enhance the effect of these compounds.

It was also an object of this invention to identify compounds which are not found naturally in tomatoes but which could be produced synthetically and then added to tomato products so as to enhance the flavor of the food product.

As a result of the discovery and invention described herein, which satisfies the above objectives and provides additional advantages, we have succeeded in isolating and identifying a compound, namely, 2-isobutylthiazole, which is largely responsible for the unique flavor of certain varieties of tomatoes, for example, the Campbell 146 and VF-145. In many varieties of tomatoes, 2-isobutylthiazole is present at levels that are too low to affect the flavor and, as a result, such varieties are bland and less desirable in flavor quality.

We have also discovered that 2-isobutylthiazole, as well as other 2-alkylthiazoles, has exceptionally strong flavor enhancing properties. This compound produces a more intense, fresh tomato flavor, provides a better overall blending of the flavor of the tomato or tomato food product and improves the mouth-feel properties.

The rather unpleasant odor of pure 2-isobutylthiazole, as well as other 2-alkylthiazoles, does not suggest that this compound will improve the flavor of food products. The pure compound in aqueous solution has a spoiled, vine-like, slightly horseradish-type flavor which is rather objectionable. However, when, for example, it is added to canned tomato juice or tomato paste or tomato soup, it produces a more intense fresh tomato flavor. The characteristic flavor of 2-isobutylthiazole is distinctly detectable in slices from tomatoes of the varieties high in this compound, such as Campbell 146, once its flavor qualities are known to the taster.

Many of the alkylthiazoles have been found to possess flavor enhancing effects similar to 2-isobutylthiazole. The size of the substituent has been found to be preferably any alkyl radical from $C_3$ to $C_5$. The branched 2-alkyl derivatives are generally more effective than the straight chain or linear 2-alkylthiazoles, although the latter have desirable flavor enhancing properties at the proper concentration. 2-alkylthiazoles which have been found to produce the beneficial results as described herein include among others: 2-isobutylthiazole, 2-sec-butylthiazole, 2-sec-amylthiazole, 2-isopropylthiazole, 2-tert-butylthiazole, 2-n-butylthiazole, 2-n-amylthiazole and 2-n-propylthiazole. These compounds are effective flavor enhancers at very low concentrations ranging generally from two parts per billion to 400 parts per billion, depending on the food product in which they are used.

DETAILED DESCRIPTION

The 2-alkylthiazoles can be added directly to the food product prior to its consumption or they can be added prior to processing and canning. The following example illustrates the beneficial flavor effects when 2-isobutylthiazole is added directly to several food products just prior to their consumption. These results were obtained from a panel of experts experienced in the flavor evaluation of foods and tomato products in particular.

EXAMPLE I

1. In tomato soup at 10–20 ppb:
   Creates a distinctive flavor characteristic in the product; has an aroma characteristic like fresh tomatoes that is consistently preferred.
2. In spaghetti sauce at approximately 13 ppb:
   Reduces tartness; modifies flavor in that it apparently reduces the harshness of the acidic notes and creates a more smoothly blended flavor.
3. In bean tomato sauce at approximately 25 ppb:
   Modifies the flavor by reducing the harsh character of the tomato spice mix.
4. In blended vegetable juice at approximately 50 ppb:
   Depresses celery note, blends flavors in a desirable manner and provides an increase in fresh tomato flavor.
5. In tomato juice at approximately 50 ppb:
   Provides a fresh tomato flavor and smooths out some of the harsh notes of the tomato juice.
6. In vegetable soup at 13 ppb:
   Imparts a fresher vegetable flavor — slight tomato-like note is enhanced.

The levels of concentration of the 2-isobutylthiazole in the products as stated above were found to produce the greatest effect but it should be understood that noticeable differences in the flavors were also discernable at other concentrations. At much higher levels, the flavor became objectionable, being described by different tasters as "rancid", "medicinal" and "metallic". The threahold value of 2-isobutylthiazole in water was found to be approximately 2 ppb.

EXAMPLE II

Several forms of 2-alkylthiazoles other than 2-isobutylthiazole have been found to have favorable taste-enhancing qualities though, in general, these qualities were less effective than those provided by 2-isobutylthiazole. Each of these compounds identified below was added in different concentrations to samples of tomato soup made from tomato paste prior to the soup being heat processed at 250° F. for approximately 30 minutes. After heat processing and canning, the flavor panel tasted each of the samples and found that the flavor of each of the samples was improved to some extent. The improved flavor was described as an agreeable, fresh tomato taste with a blending out of unpleasant sharp notes. However, none of the compounds was found to be as effective as 2-isobutyl-thiazole. The compounds were rated in the order of those having greatest to least effect in tomato soup as follows:

1. 2-isobutylthiazole
2. 2-sec-butylthiazole
3. 2-sec-amylthiazole
4. 2-isopropylthiazole
5. 2-tert-butylthiazole
6. 2-n-butylthiazole
7. 2-n-amylthiazole
8. 2-n-propylthiazole It was found that by substantially increasing the concentration level of the compounds, greater flavor enhancing effects could be achieved within limits. In other tomato products, the relative effectiveness of several of the compounds may vary slightly.

EXAMPLE III

When the alkylthiazole compounds were added to a blended vegetable juice prior to pasteurization, canning and evaluation, the panel testing results were similar to those obtained when the compounds were added to tomato soup. In detail, it was found that 2-isobutylthiazole at approximately 50 ppb depressed the celery note, blended the flavors in a pleasant manner and provided a slight increase in fresh tomato flavor. The addition of 2-tert-butylthiazole at 50 ppb to another sample provided a fresh, viney tomato flavor and at 100 ppb this flavor became strong in intensity. Addition of 2sec-amylthiazole produced about the same flavor enhancing effect as that of 2-tert-butylthiazole at the same concentrations. Addition of 2-sec-butylthiazole at 200 ppb to another sample had an effect similar to that of 2-isobutylthiazole. Addition of 2-isopropylthiazole at 200 ppb or of 2-n-amylthiazole at 400 ppb increased the vegetable-like flavor. The remaining compounds, 2-n-butylthiazole and 2-n-propylthiazole, produced more limited flavor enhancing effects at about 400 ppb.

It has been found that the 2-alkylthiazoles identified herein remain in a stable chemical condition and are effective in a tomato product, such as tomato soup, for an indefinite period of time even after the product is heated to pasteurizing temperatures and then stored in sealed containers for long periods at room temperature. For example, 10–20 ppb of 2-isobutylthiazole was added to tomato soup in mixing kettles at approximately 180° F. before the soup was filled in cans, sealed and then sterilized at approximately 250° F. for 30 minutes. The product was stored for several months while held at approximately 75° F. and then opened and tasted by a testing panel. The panel reported the flavor-enhanced product to be superior to ordinary product in that its flavor was more fresh tomato-like in character and had better mouth-feel properties. The additives appeared also to provide a better blending of other ingredients in the product, such as flour and seasonings.

Synthesis of the alkylthiazoles of this invention are known in the art and are, for example, described by R. Didier and J. Metzger, "Synthese d'Alcoyl Thiazoles", in "Comptes Rendues Des Seances De l'Academie Des Sciences", Vol. 252, pgs, 1,619–1,621 (1961).

As the flavor-enhancing compounds of this invention are effective in food products at very low concentrations, they may be easily added in diluted form during the processing of the food product, such as in an edible organic solvent like propylene glycol or ethyl alcohol. The compounds may also be encapsulated and added, either during the processing of the food or later just prior to consumption, as a powder. The compounds will assume the form of a powder when incorporated in gelatin, or dextrins, or other edible polysaccharide gums.

The compounds of this invention are effective to enhance the flavor of a variety of food products which preferably contain or include a tomato ingredient regardless of the proportion of the tomato ingredient to the whole food product. For example, the compound may be added to foods such as soups, pastes, drinks, sauces and salad dressings. In encapsulated form, the compounds may be used as a seasoning or condiment to perk-up or freshen the flavor of frozen or canned tomatoes or paste products such as pizza. The compounds may further be employed to enhance the flavor of tomato paste or tomato derivatives processed from tomatoes which in their natural state lack the high flavor values found in the better tasting tomatoes. Of course, the specific food products mentioned herein are cited only as examples of the broad range of products whose flavors may be enhanced by the compounds of this invention and such examples, as well as the panel testing data provided, are in the nature of illustrations and are not intended to limit the scope of this invention.

What is claimed is:

1. A process for enhancing the flavor of tomato products which comprises adding thereto a flavor enhancing amount of from about 10 to about 400 parts per billion of a pure 2-alkylthiazole, the alkyl moiety of said 2-alkylthiazole containing from three to five carbon atoms 2. A process according to claim 1 in which the 2-alkylthiazole is 2-isobutylthiazole.

3. A process according to claim 1 in which the 2-alkylthiazole is 2-sec-butylthiazole.

4. A process according to claim 1 in which the 2-alkylthiazole is 2-sec-amylthiazole.

5. A process according to claim 1 in which the 2-alkylthiazole is 2-isopropylthiazole.

6. A process according to claim 1 in which the 2-alkylthiazole is 2-tert-butylthiazole.

7. A process according to claim 1 in which the 2-alkylthiazole is 2-n-butylthiazole.

8. A process according to claim 1 in which the 2-alkylthiazole is 2-n-amylthiazole.

9. A process according to claim 1 in which the 2-alkylthiazole is 2-n-propylthiazole.

10. A tomato product containing therein a flavor enhancing amount of from about 10 to about 400 parts per billion of a pure 2-alkylthiazole containing from three to five carbon atoms.

11. The tomato product as defined in claim 10 wherein the 2-alkylthiazole is 2-isobutylthiazole.

12. The tomato product defined in claim 10 wherein the 2-alkylthiazole is 2-sec-butylthiazole.

13. The tomato product as defined in claim 10 wherein the 2-alkylthiazole is 2-sec-amylthiazole.

14. The tomato product as defined in claim 10 wherein the 2-alkylthiazole is 2-isopropylthiazole.

15. The tomato product as defined in claim 10 wherein the 2-alkylthiazole is 2-tert-butylthiazole.

16. The tomato product as defined in claim 10 wherein the 2-alkylthiazole is 2-n-butylthiazole.

17. The tomato product as defined in claim 10 wherein the 2-alkylthiazole is 2-n-amylthiazole.

18. The tomato product as defined in claim 10 wherein the 2-alkylthiazole is 2-n-propylthiazole.

* * * * *